(No Model.)
A. M. WIATT.
BUTTER JAR.
No. 574,126.  Patented Dec. 29, 1896.
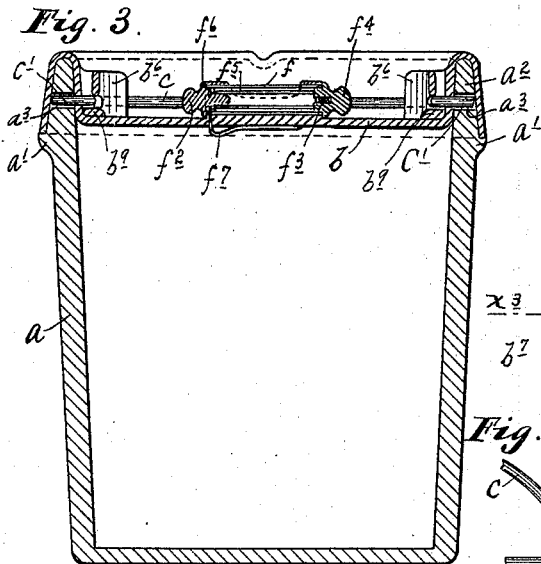
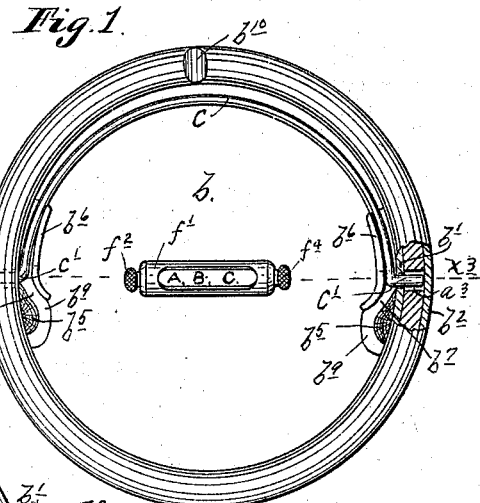
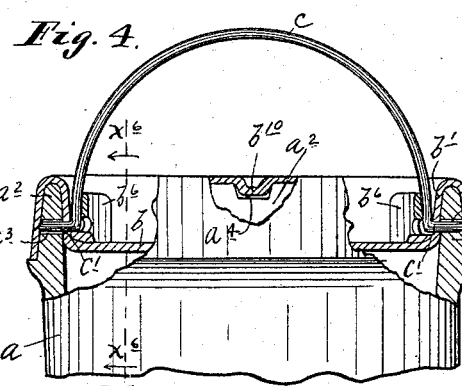
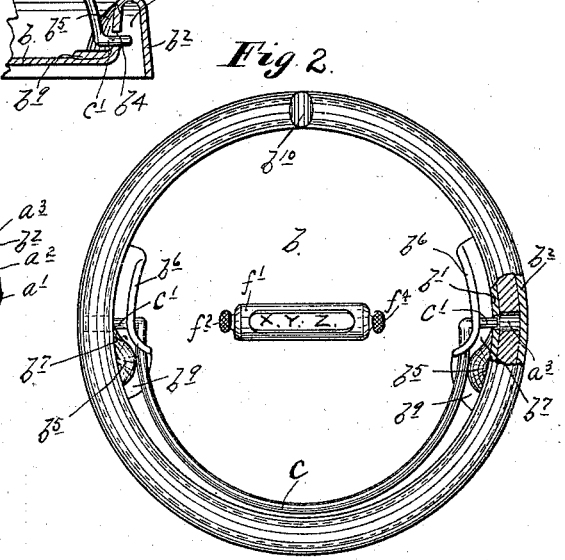
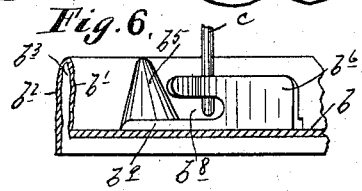
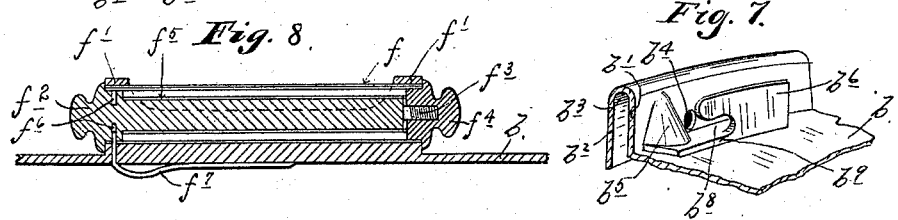
Witnesses.
C. F. Kiegre
Bessie P. Nelson
Inventor.
Addison M. Wiatt
By his Attorney,
Jas. F. Williamson
THE NORRIS PETERS CO., PHOTO-LITHO., WASHINGTON, D. C.

UNITED STATES PATENT OFFICE.

ADDISON M. WIATT, OF MINNEAPOLIS, MINNESOTA.

BUTTER-JAR.

SPECIFICATION forming part of Letters Patent No. 574,126, dated December 29, 1896.

Application filed July 28, 1896. Serial No. 600,757. (No model.)

*To all whom it may concern:*

Be it known that I, ADDISON M. WIATT, a citizen of the United States, residing at Minneapolis, in the county of Hennepin and State of Minnesota, have invented certain new and useful Improvements in Butter-Jars, &c.; and I do hereby declare the following to be a full, clear, and exact description of the invention, such as will enable others skilled in the art to which it appertains to make and use the same.

My invention relates to butter-jars or other vessels, and has for its object to improve the same, with a view of increased convenience and economy in handling and shipment.

To these ends my invention consists of the novel devices and combinations of devices hereinafter described, and defined in the claims.

The invention is illustrated in the accompanying drawings, wherein, like letters referring to like parts throughout the several views—

Figure 1 is plan view of a butter-jar equipped with my improvement, with some parts broken away and others shown in section. Fig. 2 is a similar view, but with the bail and the directing device in opposite extreme positions from that shown in Fig. 1. Fig. 3 is a vertical section on the line $x^3$ $x^3$ of Fig. 1, looking toward the downturned bail. Fig. 4 is a view similar to Fig. 3, but with the bail in its vertical position and with some parts broken away. Fig. 5 is a detail in section, showing part of the cover and bail detached, on the same line and in the same position as in Fig. 4, but looking in the opposite direction. Fig. 6 is a detail in section, looking at the cover and part of the bail, on the line $x^6$ $x^6$ of Fig. 4. Fig. 7 is a perspective view of the cam and stop lugs which coöperate with the bail, detached. Fig. 8 is a longitudinal vertical section through the directing device and a part of the cover, detached.

$a$ represents the vessel-body, and $b$ $b'$ $b^2$ the cover for the same. The body $a$ is provided with an external flange or collar $a'$, and the upper edge or rim $a^2$ of the said body is chamfered or beveled on its external surface, as best shown in Figs. 3 and 4. The cover is made up of the central or principal portion $b$ and the parts $b'$ $b^2$, so related to each other and to the part $b$ as to form a rim-seat $b^3$ of conical form in cross-section, so as to cause the parts $b'$ and $b^2$ to fit over the rim $a^2$ of the vessel. The part $b^2$ is of a greater length than the part $b'$, so that when the cover is removed it will rest on the downwardly-projecting lip or external flange $b^2$, and thereby prevent the central or body portion $b$ of the cover from coming in contact with the table or other support on which the cover may happen to be placed. In virtue of the shape of the rim $a^2$ and the shape of the seat $b^3$ in the cover the said parts fit together with a wedging action, which secures a tight joint between the same. This fact and the fact that the lower edge of the external flange $b^2$ rests on the body collar or flange $a'$ insures complete protection against the entrance of dirt, dust, or insects when the cover is in position on the vessel, as best shown in Figs. 3 and 4.

The vessel-rim $a^2$ is provided with eyes $a^3$, which coöperate with registering eyes $b^4$ in the part $b'$ of the cover to receive the lugs $c'$ of the spring-bail $c$ $c'$ when the cover is in position on the vessel. The external flange or lip $b^2$ of the cover therefore overlies the bail-openings in the rim when the cover is in working position on the vessel. With this construction it is obvious that when the bail-lugs are in working position in the eyes for the same in the cover and the vessel the bail serves to connect or lock together the cover and the vessel; and it is further obvious that the bail-lugs may be disengaged from the rim of the vessel without necessarily being disengaged from the cover.

For controlling the relations of the bail to the cover and the rim of the vessel at different parts of its pivotal movement I provide lugs $b^5$ and $b^6$, or other equivalent devices, secured to the cover and so related to each other and to the bail that the lugs $b^5$ will serve as cams to force the bail-lugs $c'$ out of engagement with the eyes $a^3$ of the vessel-rim when the bail is thrown into the position shown in Fig. 2, or substantially horizontal at one side of the center. The cover will then be unlocked from the vessel and may be readily removed therefrom at will. The other lugs $b^6$ are in the nature of stops-lugs, which serve to hold the bail in its locked position at all other points of its pivotal movement, or except during that part of the same when subject to the action of the unlocking cam-lugs $b^5$. Otherwise stated, when the bail is in its vertical or carrying position, as shown in Fig. 4, or in its shipping position, as shown in Fig. 1, the stop-lugs $b^6$ will prevent the bail from becoming disengaged from the vessel. The cam-lugs $b^5$ and the stop-lugs $b^6$ are so related to each other in the horizontal plane as to afford a passage or the necessary clearance $b^7$ for the movement of the bail between the same under its pivotal action. The said parts $b^5$ and $b^6$ are also so related as to overlap, and thereby prevent the lateral displacement of the bail at all points except when in unlocking or inserting position. The stop-lugs $b^6$ are cut away at $b^8$ directly opposite the bail-eyes $b^4$ in the cover, so as to permit the bail-lugs $c'$ to be entered into the said eyes when the bail is in the position shown in Fig. 2. The said lugs $b^5$ and $b^6$ are shown as formed integral with a common base $b^9$, which is secured to the cover in any suitable way. It is of course obvious that the said lugs might be separately made and be separately secured to the cover. The cover $b$ $b'$ $b^2$ is most conveniently made by stamping or pressing the same up into the form shown out of sheet-steel or other metal; but it will be understood, of course, that it might be made out of any other material and in any other way as long as it is provided with the essential elements for serving its functions.

The rim-crown of the cover is provided with a depressed lug $b^{10}$ for coöperation with a corresponding seat $a^4$ in the edge of the rim $a^2$ to serve as registering-guides when putting the cover on the vessel. Whenever the lug $b^{10}$ engages with its seat $a^4$ the bail-eyes $b^4$ of the cover will be in registration with the eyes $a^3$ of the vessel-rim $a^2$, and the bail-lugs may of course be entered by simply releasing the same and turning the bail from the position shown in Fig. 2 into the positions shown in Figs. 1, 3, and 4 or into any position outside the scope of the action of the cam-lugs $b^5$.

From the foregoing description it must be obvious that a cover is provided which will insure a tight joint when in position on the vessel and that the bail and devices coöperating therewith will serve to lock and unlock the vessel and its cover at the will of the operator. This is of great convenience in handling and shipping.

As another feature of my invention I provide a directing device for shipping purposes. As shown, the directing device comprises a transparent tube $f$, secured by keepers $f'$ or otherwise to the cover, and a roller composed of the parts $f^2$ $f^3$ $f^4$ for holding the tag or card $f^5$. The tube $f$ is open at its ends, so as to permit the roller to be placed in position after the tag $f^5$ has been applied. The heads of the roller are adapted to form stoppers for the ends of the tube, and the part $f^3$ of the roller-spindle is engaged by the head $f^4$ as a nut, and the clearance between the spindle and the nut is sufficient to permit the nut $f^4$ to draw the two parts together against the keepers $f'$ with sufficient force to hold the same together, while permitting the roller to be turned at will. At some convenient point the roller is provided with a pair of notches $f^6$ for coöperation with the spring catch or detent $f^7$, shown as secured to the under side of the cover, with its vertical portion working through a suitable passage in the cover and adapted to engage with one or the other of said notches $f^6$ for locking the roller in either one of two opposite extreme positions. The vessel was especially designed for use as a butter-jar for shipping butter from the maker-man to a commission-man or other user. In this kind of service the jar would be making a constant circuit over and over again between two points. Hence if the tag $f^5$ be marked on one side with the proper directions for the commission-man, as "A, B, C," for example, and be marked on the other side with the proper directions, as "X, Y, Z," for the maker it will only be necessary to reverse the roller from one to the other of its extreme positions, as illustrated in Figs. 1 and 2, for rendering the proper directions readable on the cover. This is of course a great convenience. This directing device might of course take other forms as long as the same is capable of use for two or more points by simply shifting the roller or other equivalent device.

Although my invention is herein described, for purpose of illustration, as applied to a butter-jar, it will be understood, of course, that the same is capable of use on many other kinds of vessels. It will also be understood that the details of the construction shown might be changed without departing from the spirit of my invention.

It should have been noted that the directing device secured to the cover, in the form shown, serves as a convenient handle or finger-piece for lifting the cover out from the vessel when the bail is in its unlocking position, as shown in Fig. 2.

What I claim, and desire to secure by Letters Patent of the United States, is as follows:

1. The combination with a vessel and its cover, of a spring-bail operative to lock and unlock said parts, and a cam lug or lugs located in the path of said bail and to one side of its pivots, whereby said bail will be unlocked or disengaged when turned down on one side, but will be left in engagement with said vessel when raised or when turned down on the other side of said vessel, substantially as described.

2. The combination with a vessel and its cover, of a spring-bail operative to lock and unlock said parts, cam-lugs in the path of the bail for disengaging the same from the vessel, at some point in its pivotal movement, to unlock the cover, and stop-lugs operative, at other points of the bail's pivotal movement, to hold the same in engagement with the vessel, for locking the said parts together, substantially as described.

3. The combination with a vessel and its cover, of a spring-bail operative to lock and unlock said parts, the cam-lugs $b^5$ secured to the cover and operative to throw the bail into its unlocking position, and the stop-lugs $b^6$ also secured to the cover and operative to hold the bail in its locking position, with the said lugs $b^5$ and $b^6$ arranged to overlap and afford the passages $b^7$ and $b^8$, substantially as and for the purposes set forth.

4. The combination with the vessel $a$ having the external collar $a'$ and the externally-beveled rim $a^2$ provided with the bail-eyes $a^3$, of the cover composed of the parts $b$, $b'$ $b^2$, as described, having the bail-eyes $b^4$, the spring-bail $c$, $c'$, the cam-lugs $b^5$ secured to the cover, and the stop-lugs $b^6$ also secured to the cover, with said lugs $b^5$ and $b^6$ so related as to overlap and have clearance-passages $b^7$ and $b^8$, all for coöperation substantially as described.

In testimony whereof I affix my signature in presence of two witnesses.

ADDISON M. WIATT.

Witnesses:
JAS. F. WILLIAMSON,
BESSIE B. NELSON.